United States Patent
Hwang et al.

(10) Patent No.: US 9,234,578 B2
(45) Date of Patent: Jan. 12, 2016

(54) HYDRAULIC PRESSURE SUPPLY SYSTEM OF AUTOMATIC TRANSMISSION

(71) Applicant: Hyundai Motor Company, Seoul (KR)

(72) Inventors: Jin Young Hwang, Busan (KR); Taehwan Wi, Bucheon-si (KR); Se Hwan Jo, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 381 days.

(21) Appl. No.: 13/728,811

(22) Filed: Dec. 27, 2012

(65) Prior Publication Data

US 2014/0060681 A1      Mar. 6, 2014

(30) Foreign Application Priority Data

Sep. 3, 2012 (KR) .................. 10-2012-0097309

(51) Int. Cl.
*F16H 61/38*         (2006.01)
*F16H 61/00*         (2006.01)
*F04B 23/04*         (2006.01)
*F04B 25/00*         (2006.01)

(52) U.S. Cl.
CPC ............. *F16H 61/0031* (2013.01); *F04B 23/04* (2013.01); *F04B 25/00* (2013.01); *F16H 61/38* (2013.01); *F16H 2061/0037* (2013.01); *Y10T 137/86139* (2013.01)

(58) Field of Classification Search
CPC ............ F16H 61/38; F16H 2061/0037; F16H 61/0031; F04B 23/04; F04B 35/01; F04B 41/06; F04B 23/06; F04B 23/08; F04B 23/10; F04B 23/12; F04B 23/14; F04B 25/005; F04B 25/00; F04D 13/12; F04D 13/14; F04D 25/16; F04D 25/163; F04D 29/0405; F04D 29/044; F04D 29/054; F04C 11/008; F04C 11/001; F04C 11/003; F04C 11/005; F04C 11/006; F04C 23/02; F04C 29/0071; F04C 23/001; F04C 23/005; F04C 29/005; F04C 29/0085; F04C 15/0057; F04C 15/0061; F04C 15/0069; F04C 29/0042; Y10T 137/86139
See application file for complete search history.

(56) References Cited

U.S. PATENT DOCUMENTS

| | | | | |
|---|---|---|---|---|
| 6,647,326 | B2 * | 11/2003 | Nakamori et al. | 701/22 |
| 6,739,994 | B1 * | 5/2004 | Van Rooij et al. | 474/28 |
| 8,668,468 | B2 * | 3/2014 | Hwang | F16H 61/0025 417/253 |
| 8,672,791 | B2 * | 3/2014 | Miyata | B60K 6/365 475/5 |

* cited by examiner

Primary Examiner — Bryan Lettman
(74) Attorney, Agent, or Firm — Morgan, Lewis & Bockius LLP

(57) ABSTRACT

A hydraulic pressure supply system of an automatic transmission for a vehicle which generates low hydraulic pressure and high hydraulic pressure using oil stored in an oil pan and supplies the low hydraulic pressure and the high hydraulic pressure respectively to a low pressure portion and a high pressure portion. The system includes a low-pressure hydraulic pump driven by a first power source so as to pump the oil stored in the oil pan, generating the low hydraulic pressure, and supplying the low hydraulic pressure to the low pressure portion, and a high-pressure hydraulic pump driven by a second power source and fluid-connected to the low-pressure hydraulic pump so as to receive the low hydraulic pressure from the low-pressure hydraulic pump, changing the low hydraulic pressure into the high hydraulic pressure, and supplying the high hydraulic pressure to the high pressure portion.

13 Claims, 3 Drawing Sheets

HYDRAULIC PRESSURE SUPPLY SYSTEM OF AUTOMATIC TRANSMISSION

CROSS-REFERENCE TO RELATED APPLICATION

The present application claims priority to Korean Patent Application No. 10-2012-0097309 filed on Sep. 3, 2012, the entire contents of which is incorporated herein for all purposes by this reference.

BACKGROUND OF THE INVENTION

1. Field of the Invention

The present invention relates to a hydraulic pressure supply system of an automatic transmission for a vehicle. More particularly, the present invention relates to a hydraulic pressure supply system of an automatic transmission for a vehicle which can improve safety and reliability as a consequence of operating a high-pressure hydraulic pump by driving torque of an engine when the high-pressure hydraulic pump does not operated due to failure of the high-pressure hydraulic pump.

2. Description of Related Art

Recently, vehicle makers direct all their strength to improve fuel economy due to worldwide high oil prices and strengthen of exhaust gas regulations.

Improvement of fuel economy may be achieved by improving power delivery efficiency in an automatic transmission, and improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Since power consumption for driving the hydraulic, pumps can be minimized, fuel economy may be enhanced. In addition, since a load applied to the hydraulic pumps is reduced, noise and vibration may be reduced and durability may be improved.

In a conventional hydraulic pressure supply system, the low-pressure hydraulic pump and the high-pressure hydraulic pump are driven by one drive shaft or the low-pressure hydraulic pump is driven by driving torque of an engine and the high-pressure hydraulic pump is driven by driving torque of a motor.

In a case that the low-pressure hydraulic pump and the high-pressure hydraulic pump are driven by one drive shaft, however, it is impossible to control rotation speeds of the low-pressure hydraulic pump and the high-pressure hydraulic pump independently. In addition, since the high-pressure hydraulic pump discharges the maximum pressure demanded by a transmission, unnecessary power loss may occur.

On the contrary, in a case that the low-pressure hydraulic pump is driven by the driving torque of the engine and the high-pressure hydraulic pump is driven by the driving torque of the motor, the motor may not operate due to failure of the motor or lack of SOC of a battery In this case, the hydraulic pressure is not supplied to the high pressure portion and the transmission may be damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of improving safety and reliability as a consequence of operating a high-pressure hydraulic pump by driving torque of an engine when the high-pressure hydraulic pump does not operated due to failure of the high-pressure hydraulic pump.

In an aspect of the present invention, a hydraulic pressure supply system of an automatic transmission for a vehicle which generates low hydraulic pressure and high hydraulic pressure using oil stored in an oil pan and supplies the low hydraulic pressure and the high hydraulic pressure respectively to a low pressure portion and a high pressure portion, may include a low-pressure hydraulic pump driven by a first power source so as to pump the oil stored in the oil pan, generating the low hydraulic pressure, and supplying the low hydraulic pressure to the low pressure portion, and a high-pressure hydraulic pump driven by a second power source and fluid-connected to the low-pressure hydraulic pump so as to receive the low hydraulic pressure from the low-pressure hydraulic pump, changing the low hydraulic pressure into the high hydraulic pressure, and supplying the high hydraulic pressure to the high pressure portion.

The first power source is an engine.

The second power source is a motor.

The hydraulic pressure supply system may include a pump housing receiving the low-pressure hydraulic pump and the high-pressure hydraulic pump coaxially therein, and a clutch mounted in the pump housing and selectively connecting a first drive shaft coupled to the first power source in the low-pressure hydraulic pump with a second drive shaft coupled to the second power source in the high-pressure hydraulic pump, and a solenoid valve selectively supplying operating pressure to the clutch.

The hydraulic pressure supply system may further include a transmission control unit controlling the solenoid valve, and a control unit controlled by the transmission control unit and controlling the second power source.

The pump housing may include a first inlet fluidly connected to the oil pan and adapted to supply the oil of the oil pan to the low-pressure hydraulic pump, a first outlet discharging the low hydraulic pressure generated by the low-pressure hydraulic pump and fluidly connected to the low pressure portion so as to supply the low hydraulic pressure to the low pressure portion, a connecting hydraulic line fluidly connected to the first outlet, a second inlet fluidly connected to the connecting hydraulic line and the high-pressure hydraulic pump such that the low hydraulic pressure discharged from the low-pressure hydraulic pump is supplied to the high-pressure hydraulic pump, a second outlet discharging the high hydraulic pressure generated by the high-pressure hydraulic pump and fluidly connected to the high pressure portion so as to supply the high hydraulic pressure to the high pressure portion, and a clutch receiving portion accommodating the clutch therein.

The clutch is a multi-plate clutch of hydraulic pressure type.

The clutch may include a clutch retainer connected to the second drive shaft of the high-pressure hydraulic pump, a plurality of clutch plates being disposed on the clutch retainer, a clutch hub connected to the first drive shaft of the low-pressure hydraulic pump, a plurality of clutch disks being disposed on the clutch hub between the clutch plates, a piston disposed in the clutch retainer and forming a hydraulic chamber between the clutch retainer and the piston, a return spring disposed on an opposite side of the hydraulic chamber and elastically biasing the piston toward the hydraulic chamber, and an operating hydraulic line fluid-connected to the hydraulic chamber and supplying operating pressure of the solenoid valve to the hydraulic chamber.

The clutch retainer is splined to the second drive shaft through a first inner boss portion.

The clutch hub is splined to the first drive shaft through a second inner boss portion.

The hydraulic pressure supply system may further include a low-pressure regulator valve which is fluid-connected to a low pressure line fluid-connecting the low-pressure hydraulic pump and the low pressure portion and adjusting the low hydraulic pressure generated by the low-pressure hydraulic pump.

A first recirculation line fluid-connects the low-pressure regulator valve to upstream of the low-pressure hydraulic pump for supplying a portion of the low hydraulic pressure back to the low-pressure hydraulic pump.

The hydraulic pressure supply system may further include a high-pressure regulator valve which is fluid-connected to a high pressure line fluid-connecting the high-pressure hydraulic pump and the high pressure portion and adjusting the high hydraulic pressure generated by the high-pressure hydraulic pump.

A second recirculation line fluid-connects the high-pressure regulator valve to upstream of the high-pressure hydraulic pump for supplying a portion of the high hydraulic pressure back to the high-pressure hydraulic pump.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
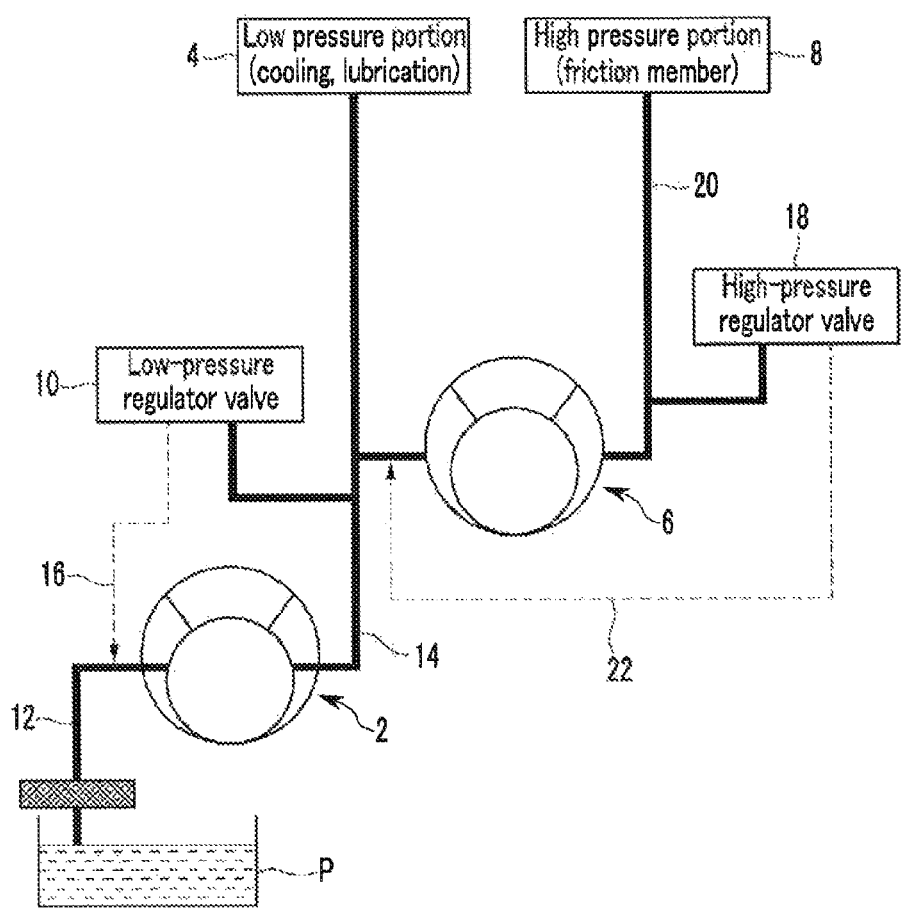
FIG. 1 is a schematic diagram of a hydraulic pressure supply system of an automatic transmission according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a hydraulic pressure supply system of an automatic transmission according to an exemplary embodiment of the present invention.

Referring to FIG. 1, a hydraulic pressure supply system according to an exemplary embodiment of the present invention is adapted to supply low hydraulic pressure generated by a low-pressure hydraulic pump 2 to a low pressure portion 4 such as a torque converter (TIC), a cooling portion, a lubrication portion and to supply high hydraulic pressure generated by a high-pressure hydraulic pump 6 to a high pressure portion 8 for operating friction members related to shifting.

The low hydraulic pressure is a lower pressure facilitating operation of the torque converter (TIC) and cooling and lubrication, and the high hydraulic pressure is a high pressure facilitating operation of a plurality of friction members.

The hydraulic pressure generated by the low-pressure hydraulic pump 2 is controlled to a stable hydraulic pressure by a low-pressure regulator valve 10 and is then supplied to the low pressure portion 4.

That is, the low-pressure hydraulic pump 2 receives oil stored in an oil pan P through an input line 12 and discharges the low hydraulic pressure to a low-pressure line 14.

In addition, the low-pressure regulator valve 10 is connected to the low-pressure line 14 and is connected to the input line 12 through a first recirculation line 16.

Therefore, the low-pressure regulator valve 10 flows a portion of the hydraulic pressure supplied through the low-pressure line 14 back to the input line 12 through the recirculation line 16 so as to adjust the hydraulic pressure.

The hydraulic pressure generated by the high-pressure hydraulic pump 6 is controlled to a stable hydraulic pressure by a high-pressure regulator valve 18 and is then supplied to the high pressure portion 8.

The high-pressure hydraulic pump 6 changes the low hydraulic pressure supplied from the low-pressure hydraulic pump 2 into the high hydraulic pressure and supplies the high hydraulic pressure to the high pressure portion 8 through a high-pressure line 20.

That is, the high-pressure regulator valve 18 is connected to the high-pressure line 20 and is connected to the low-pressure line 14 through a second recirculation line 22. Therefore, the high-pressure regulator valve 18 recirculates a portion of the hydraulic pressure supplied through the high-pressure line 20 through the second recirculation line 22 so as to adjust the hydraulic pressure.

Therefore, the low hydraulic pressure generated by the low-pressure hydraulic pump 2 is supplied to the low pressure portion 4 and the high hydraulic pressure generated by the high-pressure hydraulic pump 6 is supplied to the high pressure portion 8.

Figure 2:
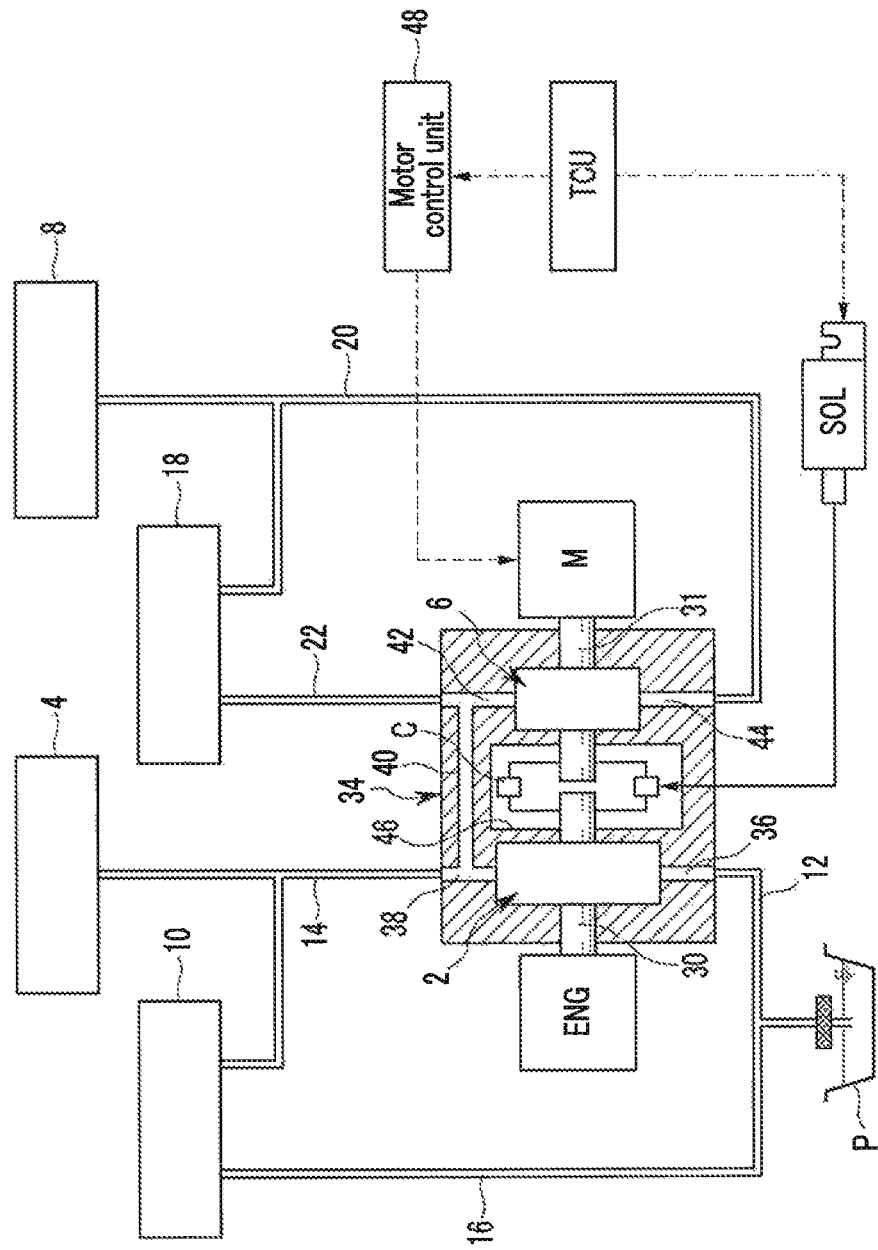
FIG. 2 is a schematic diagram of a hydraulic pump applied to a hydraulic pressure supply system according to an exemplary embodiment of the present invention.

FIG. 2 is a schematic diagram of a hydraulic pump applied to a hydraulic pressure supply system according to an exemplary embodiment of the present invention.

Referring to FIG. 2, the low-pressure hydraulic pump 2 and the high-pressure hydraulic pump 6 are operated by power of different power sources.

The low-pressure hydraulic pump 2 is connected to an engine ENG through a first drive shaft 30 and is driven by driving torque of the engine ENG. The high-pressure hydraulic pump 6 is connected to a motor M through a second drive shaft 31 and is driven by driving torque of the motor M.

In addition, the low-pressure hydraulic pump 2 and the high-pressure hydraulic pump 4 are disposed coaxially in one pump housing 34 and generate the hydraulic pressure by being driven respectively by the engine ENG and the motor M that are different power sources.

For this purpose, a first inlet 36, a first outlet 38, a connecting hydraulic line 40, a second inlet 42, a second outlet 44, and a clutch receiving portion 46 are formed at the pump housing 34, and a clutch C for selectively connecting the first drive shaft 30 with the second drive shaft 31 is disposed in the clutch receiving portion 46.

The first inlet 36 and the first outlet 38 are related to operation of the low-pressure hydraulic pump 2, and the second inlet 42 and the second outlet 44 are related to operation of the high-pressure hydraulic pump 6. In addition, the connecting hydraulic line 40 connects the first outlet 38 with the second inlet 42.

Therefore, the low-pressure hydraulic pump 2 receives the oil of the oil pan P through the first inlet 36 and the first input line 12, and the first outlet 38 is connected to the low-pressure line 14 so as to simultaneously supply the low hydraulic pressure to the low pressure portion 4 and the hydraulic pressure to the connecting hydraulic line 40.

The second inlet 42 of the high-pressure hydraulic pump 6 is connected to the first outlet 38 through the connecting hydraulic line 40 so as to receive the hydraulic pressure generated by the low-pressure hydraulic pump 2, and the second inlet 42 is connected to the high-pressure line 20 so as to supply the high hydraulic pressure to the high pressure portion 8.

The connecting hydraulic line 40 may be included in the first low-pressure line 14.

In addition, the motor M driving the high-pressure hydraulic pump 6 is controlled by a motor control unit 48, and the motor control unit 48 controls the motor M according to control of a transmission control unit TCU.

In addition, the transmission control unit TCU controls a solenoid valve SOL to supply clutch operating pressure to the clutch C. The solenoid valve SOL is connected to oil supply source of a vehicle so as to receive the oil, and generates the clutch operating pressure using the supplied oil.

If the solenoid valve SOL operates, the operating pressure is supplied to the clutch C and the clutch C connects the first and second drive shafts 30 and 31 to be operated as one drive shaft.

If the solenoid valve SOL does not operate, the operating pressure is not supplied to the clutch C and the clutch C is released. Therefore, the first and second drive shafts 30 and 31 are decoupled from each other and operate independently.

Figure 3:
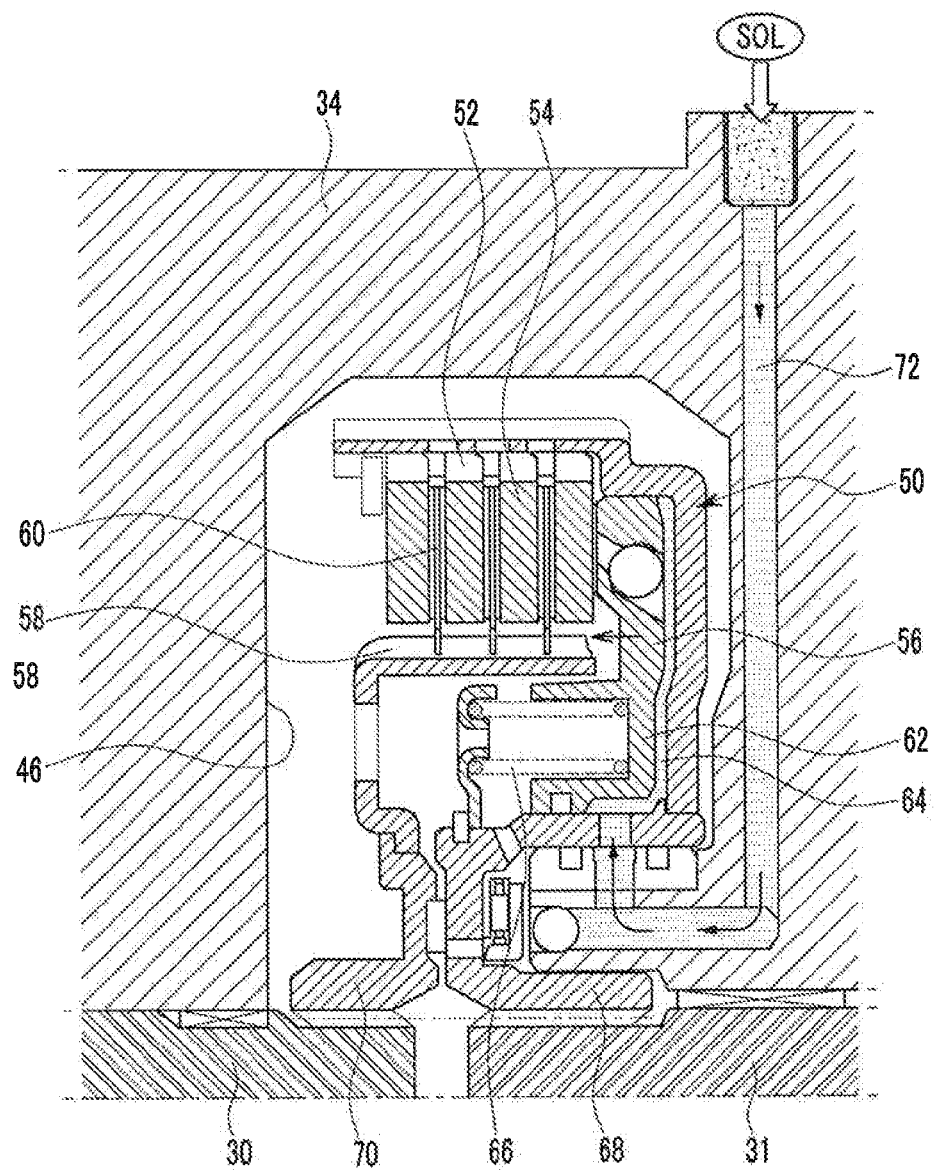
FIG. 3 is a schematic diagram of a clutch applied to a hydraulic pump of a hydraulic pressure supply system according to an exemplary embodiment of the present invention.

FIG. 3 is a schematic diagram of a clutch applied to a hydraulic pump of a hydraulic pressure supply system according to an exemplary embodiment of the present invention.

Referring to FIG. 3, the clutch C applied to an exemplary embodiment of the present invention is a multi-plate clutch using hydraulic pressure.

In further detail, a plurality of clutch plates 54 is mounted in parallel at an inner protrusion and depression portion 52 formed at an exterior circumferential portion of a clutch retainer 50, and a plurality of clutch disks 60 is disposed at an outer protrusion and depression portion 58 formed at an exterior circumferential portion of a clutch hub 56 between the clutch plates 54.

In addition, a piston 62 is disposed in the clutch retainer 50 so as to form a hydraulic chamber 64 between the clutch retainer 50 and the piston 62, and a return spring 66 always applying elastic force to the piston 62 toward the hydraulic chamber 64 is disposed at an opposite side of the hydraulic chamber 64.

An inner boss portion 68 of the clutch retainer 50 is splined to the second drive shaft 31 and an inner boss portion 70 of the clutch hub 56 is splined to the first drive shaft 30.

In addition, the hydraulic chamber 64 is connected to an operating hydraulic line 72 formed at the pump housing 34 so as to receive control pressure of the solenoid valve SOL.

It is exemplified in an exemplary embodiment of the present invention, but is not limited to that the clutch retainer 50 is connected to the second drive shaft 31 and the clutch hub 56 is connected to the first drive shaft 30. That is, the clutch retainer 50 may be connected to the first drive shaft 30 and the clutch hub 56 may be connected to the second drive shaft 31.

In addition, it is exemplified in an exemplary embodiment of the present invention, but is not limited to that the clutch C is a multi-plate clutch of hydraulic pressure type. That is, any clutch which can connect the first and second drive shafts 30 and 31 can be applied to an exemplary embodiment of the present invention.

At a normal operation, the solenoid valve SOL is switched off. If the solenoid valve SOL is switched off, the operating pressure is not supplied to the hydraulic chamber 64.

In this case, the first and second drive shafts 30 and 31 are respectively driven by the engine ENG and the motor M without rotational interference with each other so as to supply the driving torque for supplying the hydraulic pressure to the low pressure portion 4 and the high pressure portion 8.

If the high-pressure hydraulic pump 6 cannot operated due to failure of the high-pressure hydraulic pump 6 or lack of SOC of a battery during the vehicle runs, the transmission control unit TCU switches on the solenoid valve SOL.

In this case, the solenoid valve SOL supplies the control pressure to the clutch C and the control pressure received from the solenoid valve SOL is supplied to the hydraulic chamber 64 through the operating hydraulic line 72. In this case, the piston 62 overcomes the elastic force of the return spring 66 and moves forward so as to stick the clutch plate 54 and the clutch disk 60.

Therefore, the first drive shaft 30 and the second drive shaft 31 are interconnected and are driven as one drive shaft. In addition, the low-pressure hydraulic pump 2 and the high-pressure hydraulic pump 6 are driven by the driving torque of the engine ENG and supply the high hydraulic pressure. Therefore, the hydraulic pumps can operate normally.

As described above, in the hydraulic pressure supply system of the automatic transmission according to an exemplary embodiment of the present invention where the low-pressure hydraulic pump 2 is driven by the engine and the high-pressure hydraulic pump 6 is driven by the motor M, the first drive shaft 30 of the low-pressure hydraulic pump 2 and the second drive shaft 31 of the high-pressure hydraulic pump 6 are connected to each other by the clutch C when the high-pressure hydraulic pump 6 does not operate due to failure of the motor M or lack of SOC of the battery. Therefore, the high-pressure hydraulic pump 6 can be operated normally by the driving torque of the engine ENG.

Therefore, the hydraulic pressure is stably supplied to the low pressure portion 4 and the high pressure portion 8 of the automatic transmission, and safety and reliability of hydraulic pressure control may be improved.

For convenience in explanation and accurate definition in the appended claims, the terms "upper", "lower" "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A hydraulic pressure supply system of an automatic transmission for a vehicle which generates low hydraulic pressure and high hydraulic pressure using oil stored in an oil pan and supplies the low hydraulic pressure and the high hydraulic pressure respectively to a low pressure portion and a high pressure portion, the hydraulic pressure supply system comprising:
    a low-pressure hydraulic pump driven by a first power source so as to pump the oil stored in the oil pan, generating the low hydraulic pressure, and supplying the low hydraulic pressure to the low pressure portion;
    a high-pressure hydraulic pump driven by a second power source and fluid-connected to the low-pressure hydraulic pump so as to receive the low hydraulic pressure from the low-pressure hydraulic pump, changing the low hydraulic pressure into the high hydraulic pressure, and supplying the high hydraulic pressure to the high pressure portion;
    a pump housing receiving the low-pressure hydraulic pump and the high-pressure hydraulic pump coaxially therein;
    a clutch mounted in the pump housing and selectively connecting a first drive shaft coupled to the first power source in the low-pressure hydraulic pump with a second drive shaft coupled to the second power source in the high-pressure hydraulic pump; and
    a solenoid valve selectively supplying operating pressure to the clutch.

2. The hydraulic pressure supply system of claim 1, wherein the first power source is an engine.

3. The hydraulic pressure supply system of claim 1, wherein the second power source is a motor.

4. The hydraulic pressure supply system of claim 1, further including:
    a transmission control unit controlling the solenoid valve; and
    a control unit controlled by the transmission control unit and controlling the second power source.

5. The hydraulic pressure supply system of claim 1, wherein the pump housing includes:
    a first inlet fluidly connected to the oil pan and adapted to supply the oil of the oil pan to the low-pressure hydraulic pump;
    a first outlet discharging the low hydraulic pressure generated by the low-pressure hydraulic pump and fluidly connected to the low pressure portion so as to supply the low hydraulic pressure to the low pressure portion;
    a connecting hydraulic line fluidly connected to the first outlet;
    a second inlet fluidly connected to the connecting hydraulic line and the high-pressure hydraulic pump such that the low hydraulic pressure discharged from the low-pressure hydraulic pump is supplied to the high-pressure hydraulic pump;
    a second outlet discharging the high hydraulic pressure generated by the high-pressure hydraulic pump and fluidly connected to the high pressure portion so as to supply the high hydraulic pressure to the high pressure portion; and
    a clutch receiving portion accommodating the clutch therein.

6. The hydraulic pressure supply system of claim 5, further including a low-pressure regulator valve which is fluid-connected to a low pressure line fluid-connecting the low-pressure hydraulic pump and the low pressure portion and adjusting the low hydraulic pressure generated by the low-pressure hydraulic pump.

7. The hydraulic pressure supply system of claim 6, wherein a first recirculation line fluid-connects the low-pressure regulator valve to an upstream of the low-pressure hydraulic pump for supplying a portion of the low hydraulic pressure back to the low-pressure hydraulic pump.

8. The hydraulic pressure supply system of claim 5, further including a high-pressure regulator valve which is fluid-connected to a high pressure line fluid-connecting the high-pressure hydraulic pump and the high pressure portion and adjusting the high hydraulic pressure generated by the high-pressure hydraulic pump.

9. The hydraulic pressure supply system of claim 8, wherein a second recirculation line fluid-connects the high-pressure regulator valve to an upstream of the high-pressure hydraulic pump for supplying a portion of the high hydraulic pressure back to the high-pressure hydraulic pump.

10. The hydraulic pressure supply system of claim 1, wherein the clutch is a multi-plate clutch of a hydraulic pressure type.

11. The hydraulic pressure supply system of claim 10, wherein the clutch includes:
    a clutch retainer connected to the second drive shaft of the high-pressure hydraulic pump, a plurality of clutch plates being disposed on the clutch retainer;
    a clutch hub connected to the first drive shaft of the low-pressure hydraulic pump, a plurality of clutch disks being disposed on the clutch hub between the clutch plates;

a piston disposed in the clutch retainer and forming a hydraulic chamber between the clutch retainer and the piston;
a return spring disposed on an opposite side of the piston with respect to the hydraulic chamber and elastically biasing the piston toward the hydraulic chamber; and
an operating hydraulic line fluid-connected to the hydraulic chamber and supplying an operating pressure of the solenoid valve to the hydraulic chamber.

12. The hydraulic pressure supply system of claim 11, wherein the clutch retainer is splined to the second drive shaft through a first inner boss portion.

13. The hydraulic pressure supply system of claim 11, wherein the clutch hub is splined to the first drive shaft through a second inner boss portion.

* * * * *